US009875690B2

(12) United States Patent
Wang et al.

(10) Patent No.: US 9,875,690 B2
(45) Date of Patent: Jan. 23, 2018

(54) PIXEL CIRCUIT, DISPLAY SUBSTRATE AND DISPLAY PANEL

(71) Applicant: BOE TECHNOLOGY GROUP CO., LTD., Beijing (CN)

(72) Inventors: Lirong Wang, Beijing (CN); Liye Duan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 139 days.

(21) Appl. No.: 14/777,808

(22) PCT Filed: Apr. 10, 2015

(86) PCT No.: PCT/CN2015/076264

§ 371 (c)(1),
(2) Date: Sep. 17, 2015

(87) PCT Pub. No.: WO2016/070570

PCT Pub. Date: May 12, 2016

(65) Prior Publication Data

US 2016/0293105 A1 Oct. 6, 2016

(51) Int. Cl.

*G06F 3/038* (2013.01)
*G09G 5/00* (2006.01)

(Continued)

(52) U.S. Cl.

CPC ......... *G09G 3/3258* (2013.01); *G09G 3/3233* (2013.01); *G09G 3/3266* (2013.01);

(Continued)

(58) Field of Classification Search

CPC ... G09G 3/3233; G09G 3/3266; G09G 3/3258
See application file for complete search history.

(56) References Cited

U.S. PATENT DOCUMENTS 6,693,388 B2 2/2004 Oomura
2009/0309816 A1* 12/2009 Choi .................... G09G 3/3233 345/76

(Continued)

FOREIGN PATENT DOCUMENTS

CN 101976545 A 2/2011
CN 102708785 A 10/2012

(Continued)

*Primary Examiner* — Nan-Ying Yang
(74) *Attorney, Agent, or Firm* — Nath, Goldberg & Meyer; Joshua B. Goldberg

(57) ABSTRACT

The present invention provides a pixel circuit, a display substrate and a display panel. The pixel circuit comprises a power supply terminal; a control thin film transistor; a drive thin film transistor; a storage capacitor; a light-emitting device, the pixel circuit further comprises a voltage division control module and a voltage division capacitor, the voltage division control module is used for charging the storage capacitor in the pre-charging phase of the pixel circuit, so that voltage of the gate of the drive thin film transistor becomes a reference voltage, and the voltage division control module is capable of outputting a low level to the second end of the storage capacitor in the compensation phase of the pixel circuit. A first end of the voltage division capacitor is connected to the first end of the storage capacitor, a second end thereof is connected to the cathode of the light-emitting device.

15 Claims, 3 Drawing Sheets

(51) Int. Cl.

| | |
|---|---|
| ***G09G 3/30*** | (2006.01) |
| ***G09G 5/10*** | (2006.01) |
| ***G09G 3/3258*** | (2016.01) |
| ***G09G 3/3266*** | (2016.01) |
| ***G09G 3/3291*** | (2016.01) |
| ***G09G 3/3233*** | (2016.01) |

(52) U.S. Cl.

CPC ... *G09G 3/3291* (2013.01); *G09G 2300/0809* (2013.01); *G09G 2300/0819* (2013.01); *G09G 2300/0842* (2013.01); *G09G 2300/0861* (2013.01); *G09G 2320/0242* (2013.01); *G09G 2320/0646* (2013.01)

(56) References Cited

U.S. PATENT DOCUMENTS

| | | | | |
|---|---|---|---|---|
| 2010/0045637 A1* | 2/2010 | Yamashita | G09G 3/3233 | 345/204 |
| 2011/0273428 A1* | 11/2011 | Han | G09G 3/3233 | 345/212 |

FOREIGN PATENT DOCUMENTS

| | | |
|---|---|---|
| CN | 103440840 A | 12/2013 |
| CN | 103714781 A | 4/2014 |
| CN | 103943067 A | 7/2014 |
| CN | 104299572 A | 1/2015 |
| CN | 204117566 U | 1/2015 |

* cited by examiner

PIXEL CIRCUIT, DISPLAY SUBSTRATE AND DISPLAY PANEL

This is a National Phase Application filed under 35 U.S.C. 371 as a national stage of PCT/CN2015/076264 filed on Apr. 10, 2015, an application claiming the benefit to Chinese application No. 201410637704.X filed on Nov. 6, 2014; the content of each of which is hereby incorporated by reference in its entirety.

FIELD OF THE INVENTION

The present invention relates to the display field of light-emitting diode, and particularly to a pixel circuit, a display substrate comprising the pixel circuit and a display panel comprising the display substrate.

BACKGROUND OF THE INVENTION

Organic light-emitting diodes (OLEDs), as current type light-emitting devices, have been increasingly applied in high performance display. With the increase of display size, traditional passive matrix organic light-emitting display (Passive Matrix OLED) requires every pixel to be driven in shorter time, larger transient current is required, thus power consumption is large. Meanwhile, application of large current may cause excess voltage drop on ITO line, and operation voltage of OLED is too high and thus operation efficiency thereof is decreased. Active matrix organic light-emitting display (Active Matrix OLED) can solve the above problem by progressively scanning currents inputted in the OLEDs by means of switch tubes.

In large-sized display application, since power supply lines of backboard have certain resistances and drive currents of all of the pixels are supplied by a power supply, power voltages of regions close to a power supplying position on the backboard is higher than those of regions away from the power supplying position. This phenomenon is called as internal resistance drop (IR drop). Since the voltage of the power supply has influence on current, the IR drop may cause difference in currents in different regions, and thus mura may be generated in display.

In addition, when forming an OLED through evaporation, non-uniformities in film thickness may cause non-uniformities in electrical performance. In the amorphous silicon (a-Si) or oxide thin film transistor process in which an N type thin film transistor is adopted to form a pixel unit, a storage capacitor is connected between a drive thin film transistor and an anode of a light-emitting diode, when data voltage is applied to gates of drive thin film transistors, since anodes of the light-emitting diodes of the pixel units have different voltages, Vgs(s), which are actually applied on the drive thin film transistors, are different, leading to different drive currents, and thus resulting in difference in actual display brightness.

The drive current may be calculated according to the following equation (1):

$$I_{OLED}=\frac{1}{2}\mu_n C_{ox}\frac{W}{L}(V_{data}-V_{OLED}-Vth_n)^2; \tag{1}$$

Wherein $\mu_n$ is carrier mobility of the $n^{th}$ OLED;

$C_{ox}$ is capacitance of a gate oxide layer;

$$\frac{W}{L}$$

is width to length ratio of OLED;

$V_{data}$ is data voltage;

$V_{OLED}$ is operation voltage of OLED and is shared by all pixel units;

$V_{thn}$ is threshold voltage of the $n^{th}$ drive thin film transistor, and is positive for an enhanced drive thin film transistor and negative for a depletion drive thin film transistor.

It can be seen from above that, if the drive thin film transistors of different pixel units are different in $V_{thn}$, the drive currents of the light-emitting devices in the pixel units are different, and if the $V_{thn}$ of the drive thin film transistor of the pixel unit is drifted over time, the drive current thereof may be changed over time, resulting in ghost.

Therefore, how to avoid occurrence of mura, ghost, etc. when the display device is displaying becomes a problem to be solved urgently in the art.

SUMMARY OF THE INVENTION

An object of the present invention is to provide a pixel circuit and a display panel comprising the pixel circuit. When the display panel comprises the pixel circuit displays, currents for the light-emitting devices in the display panel will not be affected by the threshold voltage.

To realize the above object, as one aspect of the present invention, provided is a pixel circuit comprising:

a power supply terminal;

a control thin film transistor, a first electrode of which is connected to the power supply terminal, and the control thin film transistor is capable of being turned on in a pre-charging phase, a compensation phase and a light-emitting phase of the pixel circuit;

a drive thin film transistor, a first electrode of which is connected to a second electrode of the control thin film transistor;

a storage capacitor, a first end of which is connected to a second electrode of the drive thin film transistor, and a second end of which is connected to a gate of the drive thin film transistor;

a light-emitting device, an anode of which is connected with the second electrode of the drive thin film transistor, and a cathode of which is grounded, wherein the pixel circuit further comprising:

a voltage division control module for charging the storage capacitor in the pre-charging phase of the pixel circuit, so that voltage of the gate of the drive thin film transistor becomes a reference voltage, and the voltage division control module is capable of outputting a low level to the second end of the storage capacitor in the compensation phase of the pixel circuit; and a voltage division capacitor, a first end of which is connected to the first end of the storage capacitor, and a second end of which is connected to the cathode of the light-emitting device.

Preferably, the pixel circuit further comprises a first control terminal connected to the gate of the control thin film transistor.

Preferably, the voltage division control module comprises a first thin film transistor, a second thin film transistor, a second control terminal, a third control terminal and a reference voltage terminal, wherein the reference voltage terminal is used to supply the reference voltage, a first electrode of the first thin film transistor is connected to a data input terminal of the pixel circuit, a second electrode of the second thin film transistor is connected to the gate of the drive thin film transistor, a gate of the first thin film transistor is connected to the second control terminal, the second control terminal is capable of turning on the first thin film transistor in a data writing phase of the pixel circuit, the first electrode of the second thin film transistor is connected to the reference voltage terminal, the second electrode of the second thin film transistor is connected to the second end of the storage capacitor, a gate of the second thin film transistor is connected to the third control terminal, the third control terminal is capable of turning on the second thin film transistor in the pre-charging phase and the compensation phase of the pixel circuit.

Preferably, the reference voltage terminal and the data input terminal are formed integrally.

Preferably, the first electrode is a source, and the second electrode is a drain.

According to another aspect, the present invention provides a display substrate, comprising a plurality of pixel units arranged in rows and columns, each of the pixel units is provided therein with the above pixel circuit.

Preferably, the display substrate includes plural groups of scan lines, each group of scan lines corresponds to a row of pixel units and includes a first scan line connected to the first control terminal, for turning on the control thin film transistor in the pre-charging phase, the compensation phase and the light-emitting phase.

Preferably, each group of scan lines includes a second scan line and a third scan line, the voltage division control module comprises a first thin film transistor, a second thin film transistor, a second control terminal and a third control terminal, wherein a first electrode of the first thin film transistor is connected to a data input terminal of the pixel circuit, a second electrode of the second thin film transistor is connected to the gate of the drive thin film transistor, a gate of the first thin film transistor is connected to the second control terminal, the second control terminal is connected to the second scan line for turning on the first thin film transistor in a data writing phase of the pixel circuit, the first electrode of the second thin film transistor is connected to a reference voltage terminal, the second electrode of the second thin film transistor is connected to the second end of the storage capacitor, a gate of the second thin film transistor is connected to the third control terminal, the third control terminal is connected to the third scan line for turning on the second thin film transistor in the pre-charging phase and the compensation phase of the pixel circuit.

Preferably, the display substrate further comprises a reference voltage line connecting to the first electrode of the second thin film transistor for supplying a reference voltage to the second thin film transistor in the pre-charging phase.

Preferably, the display substrate comprises a data line integrally formed with the reference voltage line, the data line is connected to the data input terminal and is capable of supplying a reference voltage to the data input terminal in the pre-charging phase, the compensation phase and the light-emitting phase, and supplying a data voltage to the data input terminal in a writing phase.

Preferably, the first electrode is a source, and the second electrode is a drain.

According to yet another aspect, the present invention provides a display panel comprising the above display substrate, wherein the display panel comprises a power supply connected to the power supply terminal, and the power supply is capable of outputting a low level signal to the power supply terminal in the pre-charging phase of the pixel circuit, and outputting a high level signal to the power supply terminal in the compensation phase, the writing phase and the light-emitting phase of the pixel circuit.

In the light-emitting phase of the pixel circuit provided by the present invention, current flowing through the light-emitting device is independent of the threshold voltage of the drive thin film transistor, thus influence of the threshold voltage on the display is substantially eliminated, brightness uniformity of the display panel comprising the pixel circuit is improved, display defects such as mura can be eliminated. Furthermore, even if the threshold voltage of the drive thin film transistor is drifted over time, the current flowing through the light-emitting device will not be affected, therefore, ghost in the display panel comprising the pixel circuit can be eliminated.

BRIEF DESCRIPTION OF THE DRAWINGS

Accompanying drawings are used to provide further understanding of the present invention, constitute a part of the specification, and are used to explain the present invention together with the following embodiments, but not to limit the present invention, wherein.

DESCRIPTION OF REFERENCE NUMERALS

| | |
|---|---|
| Tc: control thin film transistor | Td: drive thin film transistor |
| T1: first thin film transistor | T2: second thin film transistor |
| C1: storage capacitor | C2: voltage division capacitor |
| S1: first scan line | S2: second scan line |
| S3: third scan line | 20: light-emitting device |
| DATA: data line | ELVDD: power supply terminal |
| 10: voltage division control module | |

DETAILED DESCRIPTION OF THE EMBODIMENTS

Embodiments will be described in detail below in conjunction with the accompanying drawings. It should be understood that, the embodiments described herein are only used to describe and explain the present invention, but not to limit the present invention.

As shown in FIG. 1 to FIG. 6, as one aspect of the present invention, a pixel circuit comprises: a power supply terminal ELVDD; a control thin film transistor Tc; a drive thin film transistor Td; a storage capacitor C1; a light-emitting device 20; a voltage division control module 10; and a voltage division capacitor C2.

A first electrode of the control thin film transistor Tc is connected to the power supply terminal ELVDD, and the control thin film transistor Tc is turned on in a pre-charging phase (the phase in FIG. 2), a compensation phase (the phase ② in FIG. 2) and a light-emitting phase (the phase ④ in FIG. 2) of the pixel circuit.

A first electrode of the drive thin film transistor Td is connected to a second electrode of the control thin film transistor Tc. As shown in the figures, a point indicates a gate of the drive thin film transistor Td, and b point indicates the second electrode of drive thin film transistor Td.

A first end of the storage capacitor C1 is connected to the second electrode of the drive thin film transistor Td, a second end of the storage capacitor C1 is connected to the gate of the drive thin film transistor Td, in the compensation phase of the pixel circuit, voltage between the first end and the second end of the storage capacitor C1 equals to a threshold voltage $V_{dth}$ of the drive thin film transistor Td.

The second electrode of the drive thin film transistor Td is connected to an anode of the light-emitting device 20, and a cathode of the light-emitting device 20 is grounded.

The voltage division control module 10 is used for charging the storage capacitor C1 in the pre-charging phase (the phase in FIG. 2) of the pixel circuit, so that voltage of the gate of the drive thin film transistor Td becomes a reference voltage $V_{ref}$.

A first end of the voltage division capacitor C2 is connected to the first end of the storage capacitor C1, and a second end of the voltage division capacitor C2 is connected to the cathode of the light-emitting device 20.

Figure 2:
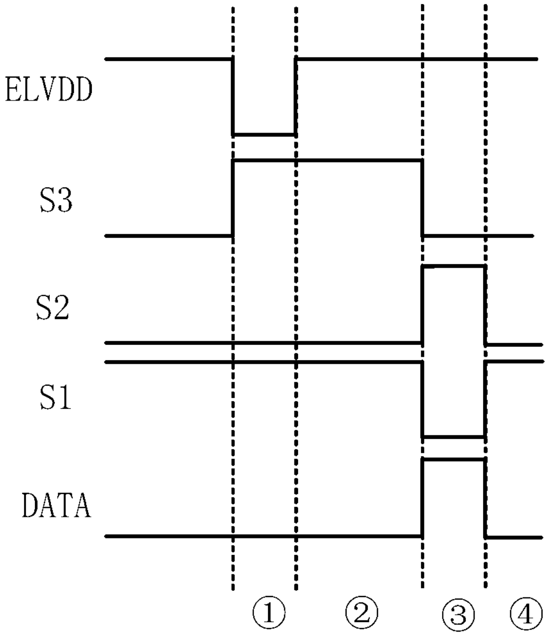
FIG. 2 is a timing chart of control signals of the pixel circuit in FIG. 1.

A person skilled in the art should understand that, the power supply terminal ELVDD is connected to a power supply for supplying a voltage to enable the light-emitting device 20 to emit light. Timing chart of power signal supplied by the power supply is shown in FIG. 2, in the pre-charging phase (the phase in FIG. 2), a low level signal ELVDD_L is inputted to the power supply terminal ELVDD, in the compensation phase (the phase ② in FIG. 2), the writing phase (the phase ③ in FIG. 2) and the light-emitting phase (the phase ④ in FIG. 2), a high level signal ELVDD_H is inputted to the power supply terminal ELVDD.

The light-emitting device 20 is an organic light-emitting device, it is easy to understand that, when potential of the anode of the light-emitting device 20 is higher than that of the cathode of the light-emitting device 20, the light-emitting device 20 begins to emit light.

In the pre-charging phase, the control thin film transistor Tc is turned on, the voltage division control module 10 charges the storage capacitor C1, so that voltage of the gate of the drive thin film transistor Td becomes the reference voltage $V_{ref}$.

In the compensation phase, the voltage division control module 10 outputs a low level to the second end of the storage capacitor C1, at this time, the drive thin film transistor Td is still turned on, and the control thin film transistor Tc is also turned on, and level of the first end of the storage capacitor C1 is pulled up through the high level ELVDD_H supplied by the power supply terminal ELVDD. At this time, the second electrode of the drive thin film transistor Td functions as a source of the drive thin film transistor Td. The first end and the second end of the storage capacitor C1 are connected between the gate and source of the drive thin film transistor Td respectively, since the potential of the gate is $V_{ref}$, and the potential of the source has been pulled up by the high level supplied by the power supply terminal, thus the potential of the first end of the storage capacitor C1 is different from the potential of the second end of the storage capacitor C1, the storage capacitor C1 begins to discharge, till the potential Va of the second end of the storage capacitor C1 is smaller than the potential Vb of the first end of the storage capacitor C1, at this time, the drive thin film transistor Td is turned off and the storage capacitor C1 stops discharging and stores the threshold voltage $V_{dth}$ of the drive thin film transistor Td.

In the data writing phase, the control thin film transistor Tc is turned off, and the storage capacitor C1 is connected between the gate and the second electrode of the drive thin film transistor Td so as to keep the voltage between the gate and the source of the drive thin film transistor Td. At this time, data voltage is applied to the pixel circuit, so that gate voltage of the drive thin film transistor Td is changed to $V_{data}$. It can be seen that, variation $\Delta V_1$ of the gate voltage of the drive thin film transistor Td is $(V_{data}-V_{ref})$. Due to voltage division function between the storage capacitor C1 and the voltage division capacitor C2, it can be seen that variation $\Delta V_2$ of the second electrode of the drive thin film transistor Td (which is the source of the drive thin film transistor Td, that is, b point in figures) is $\alpha\,(V_{data}-V_{ref})$, wherein $\alpha = C1/(C1+C2)$.

In the compensation phase, the voltage Vb of the second electrode of the drive thin film transistor Td is $(V_{ref}-V_{th})$, therefore, in the data writing phase, $Vb=(V_{ref}-V_{th})\pm\alpha\,(V_{data}-V_{ref})$, then voltage $V_{gs}$ between the gate and the source of the drive thin film transistor Td is (Va−Vb), and $Va-Vb=(1\pm\alpha)\,(V_{data}-V_{ref})\pm V_{th}$.

In the light-emitting phase, the control thin film transistor Tc is turned on, and the current flowing through the drive thin film transistor Td (that is, the current $I_{20}$ flowing through the light-emitting device) is:

$$I_{20} = \frac{1}{2}\mu C_{ox}\frac{W}{L}(V_{data} - V_{20} - V_{dth})^2 = \frac{1}{2}\mu C_{ox}\frac{W}{L}[(1 \pm \alpha)(V_{data} - V_{ref})]^2.$$

Wherein, μ is carrier mobility of the light-emitting device; $C_{ox}$ is capacitance of a gate oxide layer;

$$\frac{W}{L}$$

is width to length ratio of light-emitting device;

$V_{data}$ is data voltage;

$V_{20}$ is operation voltage of the light-emitting device;

$V_{dth}$ is threshold voltage of the drive thin film transistor.

It can be seen from above that, in the light-emitting phase, the current flowing through the light-emitting device 20 is independent of the threshold voltage $V_{dth}$ of the drive thin film transistor Td, thus influence of the threshold voltage on the display is substantially eliminated, brightness uniformity of the display panel comprising the pixel circuit is improved, display defects such as mura can be eliminated. Furthermore, even if the threshold voltage of the drive thin film transistor is drifted over time, the current flowing through the light-emitting device will not be affected, therefore, ghost in the display panel comprising the pixel circuit can be eliminated.

To ensure that the control thin film transistor Tc is turned on in the pre-charging phase, the compensation phase and light-emitting phase of the pixel circuit, preferably, the pixel circuit may further comprise a first control terminal connected to the gate of the control thin film transistor Tc. Control signal may be input to the gate of the control thin film transistor Tc through the first control terminal, specifically, in the pre-charging phase, the compensation phase and light-emitting phase, a high level signal is inputted to the gate of the control thin film transistor Tc, and in the data writing phase, a low level signal is inputted to the gate of the control thin film transistor Tc.

In the present invention, there is no special limitation on the specific structure of the voltage division control module 10, so long as the voltage division control module 10 may charge the storage capacitor in the pre-charging phase of the pixel circuit, so that the gate voltage of the drive thin film transistor reaches the reference voltage, and output a low level to the second end of the storage capacitor in the compensation phase so as to ensure that the storage capacitor may discharge normally in the compensation phase.

Figure 1:
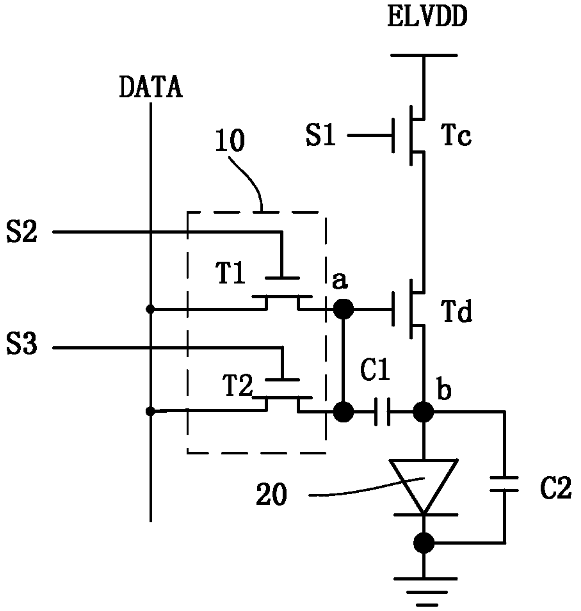
FIG. 1 is a diagram of a preferable embodiment of a pixel circuit provided in the present invention.

As one preferable embodiment of the present invention, as shown in FIG. 1, the voltage division control module 10 may comprise a first thin film transistor T1, a second thin film transistor T2, a second control terminal, a third control terminal and a reference voltage terminal, wherein the reference voltage terminal is used to supply the reference voltage, a first electrode of the first thin film transistor T1 is connected to a data input terminal of the pixel circuit, a second electrode of the second thin film transistor T2 is connected to the gate of the drive thin film transistor Td, a gate of the first thin film transistor T1 is connected to the second control terminal, the second control terminal is capable of turning on the first thin film transistor T1 in the data writing phase of the pixel circuit, the first electrode of the second thin film transistor T2 is connected to the reference voltage terminal (in the embodiment shown in FIG. 1, the reference voltage terminal and the data input terminal are formed integrally), the second electrode of the second thin film transistor T2 is connected to the second end of the storage capacitor C1, a gate of the second thin film transistor T2 is connected to the third control terminal, the third control terminal is capable of turning on the second thin film transistor T2 in the pre-charging phase and the compensation phase of the pixel circuit. Compared to the high level ELVDD_H supplied by the power supply terminal ELVDD, the reference voltage $V_{ref}$ is low level. Therefore, in the compensation phase, the reference voltage outputted from the voltage division control module to the storage capacitor C1 is low level, ensuring normal discharge of the storage capacitor C1.

Figure 3:
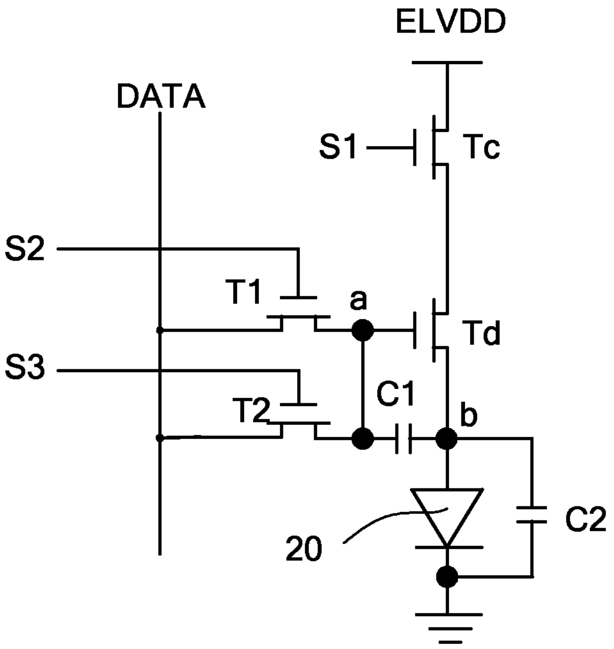
FIG. 3 is an equivalent circuit diagram of the pixel circuit in FIG. 1 in a pre-charging phase.

In the pre-charging phase, as shown in FIG. 3, the first thin film transistor T1 is turned off, at this time, the power supply terminal ELVDD has low level ELVDD_L so as to ensure the light-emitting device 20 not to emit light, the second thin film transistor T2 is turned on, the reference voltage $V_{ref}$ is supplied to the first electrode of the second thin film transistor T2 through the reference voltage terminal, since the second thin film transistor T2 is turned on, gate voltage of fourth thin film transistor T4 also becomes the reference voltage $V_{ref}$.

Figure 4:
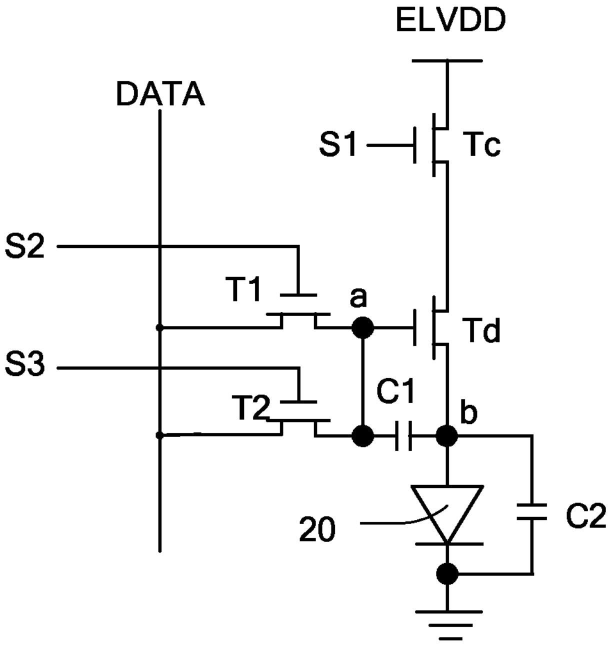
FIG. 4 is an equivalent circuit diagram of the pixel circuit in FIG. 1 in a compensation phase.
Figure 5:
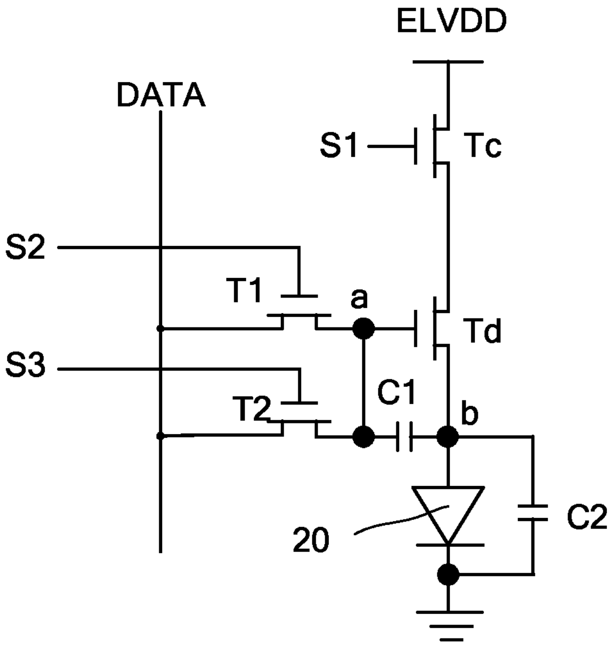
FIG. 5 is an equivalent circuit diagram of the pixel circuit in FIG. 1 in a data writing phase.
Figure 6:
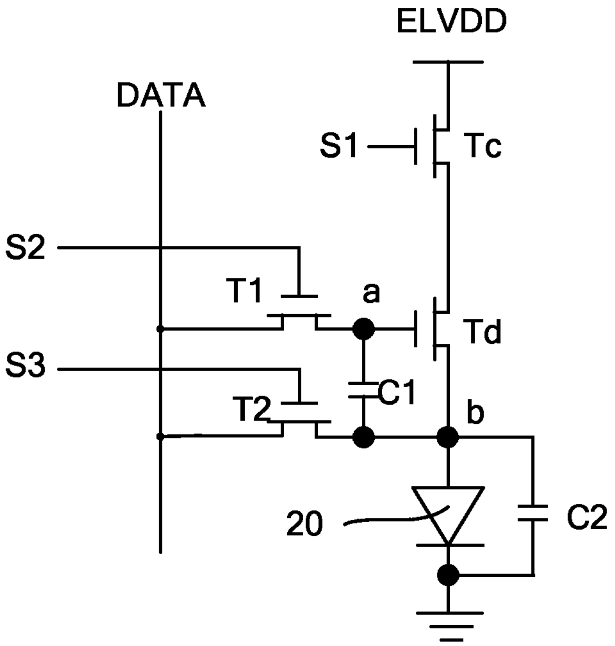
FIG. 6 is an equivalent circuit diagram of the pixel circuit in FIG. 1 in a light-emitting phase.

In the compensation phase, as shown in FIG. 4, the first thin film transistor T1 is still turned off, the power supply terminal ELVDD has high level ELVDD_H, the control thin film transistor Tc is turned on, the second thin film transistor T2 is turned on, the drive thin film transistor Td is turned on, voltage of the second electrode of the drive thin film transistor Td (that is, the b point in the figure) is pulled up by the ELVDD_H, till the gate-source voltage of the drive thin film transistor Td $(Va-Vb)<V_{dth}$, at this time, the drive thin film transistor Td is turned off, and the storage capacitor C1 stores therein the threshold voltage $V_{dth}$ of the drive thin film transistor Td.

In the data writing phase, low levels are inputted through the first control terminal and the third control terminal, and a high level is inputted through the second control terminal, at this time, the control thin film transistor Tc and the second thin film transistor T2 are turned off, the first thin film transistor T1 and the drive thin film transistor Td are turned on, thus the storage capacitor C1 is connected between the gate and second electrode (that is, the source) of the drive thin film transistor Td so as to keep the gate-source voltage of the drive thin film transistor, the data voltage is written through the first thin film transistor T1 and the gate voltage of the drive thin film transistor Td is changed to $V_{data}$.

In the light-emitting phase, the second control terminal and the third control terminal have low level, and the first control terminal has high level, thus the control thin film transistor Tc is turned on, the power supply terminal ELVDD supplies the high level ELVDD_H to enable the light-emitting device 20 to emit light, therefore current flows through the light-emitting device 20 so that the light-emitting device 20 emits light.

To simplify the structure of the pixel circuit, preferably, the reference voltage terminal and the data input terminal are formed integrally. That is, the data voltage and the reference voltage may be supplied through the data line, the reference voltage $V_{ref}$ is low level with respect to the data voltage $V_{data}$.

As another aspect of the present invention, a display substrate comprises a plurality of pixel units arranged in rows and columns, each of the pixel units is provided therein with the above pixel circuit. Since when the pixel circuit is emitting light, current flowing through the light-emitting device is independent of the threshold voltage of the drive thin film transistor, the brightness of the light-emitting device is immune to the drift of the threshold voltage of the drive thin film transistor, and immune to the non-uniformity of film thickness of the light-emitting device, that is to say, a display panel comprising the display substrate may have good brightness uniformity and cannot generate display defects such as mura and ghost.

The display substrate provided in the present invention may be applied to the active matrix organic light-emitting diode display device. That is, the display substrate may include plural groups of scan lines, each group of scan lines corresponds to a row of pixel units.

As described above, signal may be supplied to the control thin film transistor Tc through the first control terminal so as to control the control thin film transistor Tc to be turned on in the pre-charging phase, the compensation phase and the light-emitting phase. Accordingly, each group of scan lines includes a first scan line S1 connected to the first control terminal, for turning on the control thin film transistor Tc in the pre-charging phase, the compensation phase and the light-emitting phase. FIG. 2 shows the timing chart of scan signal in the first scan line S1.

In the above pixel circuit, the voltage division control module comprises the first thin film transistor T1, the second thin film transistor T2, the second control terminal and the third control terminal, wherein the first electrode of the first thin film transistor T1 is connected to the data input terminal, the second electrode of the second thin film transistor T2 is connected to the gate of the drive thin film transistor Td, the gate of the first thin film transistor T1 is connected to the second control terminal. Accordingly, each group of scan lines includes a second scan line S2 and a third scan line S3, the second control terminal is connected to the second scan line S2 for turning on the first thin film transistor T1 in the data writing phase of the pixel circuit, the first electrode of the second thin film transistor T2 is connected to the reference voltage terminal, the second electrode of the second thin film transistor T2 is connected to the second end of the storage capacitor C1, the gate of the second thin film transistor T2 is connected to the third control terminal, the third control terminal is connected to the third scan line S3 for turning on the second thin film transistor T2 in the pre-charging phase and the compensation phase of the pixel circuit.

FIG. 2 shows timing charts of scan signals in the second scan line S2 and the third scan line S3.

Preferably, the display substrate further comprises a reference voltage line connected to the first electrode of the second thin film transistor, for supplying the reference voltage to the second thin film transistor in the pre-charging phase.

To simplify the structure of the display substrate, preferably, the display substrate comprises a data line DATA, which is integrally formed with the reference voltage line (that is, the data line DATA may supply not only data voltage but also reference voltage), the data line is connected to the data input terminal, and the data line may supply reference voltage to the data input terminal in the pre-charging phase, the compensation phase and the light-emitting phase, and supply data voltage to the data input terminal in the data writing phase.

As yet another aspect of the present invention, provided is a display panel comprising the above display substrate, wherein the display panel further comprises a power supply connected to the power supply terminal, and the power supply is capable of outputting a low level signal to the power supply terminal in the pre-charging phase of the pixel circuit, and outputting a high level signal to the power supply terminal in the compensation phase, the data writing phase and the light-emitting phase of the pixel circuit.

The display panel provided in the present invention is especially applicable to large-sized displays such as TV, display of computer and the like.

It should be understood that, the above embodiments are only exemplary embodiments used to explain the principle of the present invention and the protection scope of the present invention is not limited thereto. The person skilled in the art can make various variations and modifications without departing from the spirit and scope of the present invention, and these variations and modifications should be considered to belong to the protection scope of the invention.

The invention claimed is:

1. A pixel circuit, comprising:

a power supply terminal;

a control thin film transistor, a first electrode of which is connected to the power supply terminal, and the control thin film transistor is capable of being turned on in a pre-charging phase, a compensation phase and a light-emitting phase of the pixel circuit;

a drive thin film transistor, a first electrode of which is connected to a second electrode of the control thin film transistor;

a storage capacitor, a first end of which is connected to a second electrode of the drive thin film transistor, and a second end of which is connected to a gate of the drive thin film transistor;

a light-emitting device, an anode of which is connected with the second electrode of the drive thin film transistor, and a cathode of which is grounded, wherein the pixel circuit further comprising:

a voltage division control module for charging the storage capacitor in the pre-charging phase of the pixel circuit, so that voltage of the gate of the drive thin film transistor becomes a reference voltage, and the voltage division control module is capable of outputting a low level to the second end of the storage capacitor in the compensation phase of the pixel circuit; and a voltage division capacitor, a first end of which is connected to the first end of the storage capacitor, and a second end of which is connected to the cathode of the light-emitting device, wherein the voltage division control module comprises a first thin film transistor, a second thin film transistor, a second control terminal, a third control terminal and a reference voltage terminal, wherein the reference voltage terminal is used to supply the reference voltage, a first electrode of the first thin film transistor is connected to a data input terminal of the pixel circuit, a second electrode of the second thin film transistor is connected to the gate of the drive thin film transistor, a gate of the first thin film transistor is connected to the second control terminal, the second control terminal is capable of turning on the first thin film transistor in a data writing phase of the pixel circuit, the first electrode of the first thin film transistor is connected to the reference voltage terminal, the second electrode of the second thin film transistor is connected to the second end of the storage capacitor, a gate of the second thin film transistor is connected to the third control terminal, and the third control terminal is capable of turning on the second thin film transistor in the pre-charging phase and the compensation phase of the pixel circuit.

2. The pixel circuit of claim 1, further comprising a first control terminal connected to the gate of the control thin film transistor.

3. The pixel circuit of claim 1, wherein the reference voltage terminal and the data input terminal are formed integrally.

4. The pixel circuit of claim 1, wherein the first electrode is a source, and the second electrode is a drain.

5. The pixel circuit of claim 2, wherein the first electrode is a source, and the second electrode is a drain.

6. A display substrate, comprising a plurality of pixel units arranged in rows and columns, each of the pixel units is provided therein with a pixel circuit of claim 1.

7. The display substrate of claim 6, includes plural groups of scan lines, each group of scan lines corresponds to a row of pixel units and includes a first scan line connected to the first control terminal, for turning on the control thin film transistor in the pre-charging phase, the compensation phase and the light-emitting phase.

8. The display substrate of claim 7, wherein each group of scan lines includes a second scan line and a third scan line, the voltage division control module comprises a first thin film transistor, a second thin film transistor, a second control terminal and a third control terminal, wherein a first electrode of the first thin film transistor is connected to a data input terminal of the pixel circuit, a second electrode of the second thin film transistor is connected to the gate of the drive thin film transistor, a gate of the first thin film transistor is connected to the second control terminal, the second control terminal is connected to the second scan line for turning on the first thin film transistor in a data writing phase of the pixel circuit, the first electrode of the second thin film transistor is connected to a reference voltage terminal, the second electrode of the second thin film transistor is connected to the second end of the storage capacitor, a gate of the second thin film transistor is connected to the third control terminal, the third control terminal is connected to the third scan line for turning on the second thin film transistor in the pre-charging phase and the compensation phase of the pixel circuit.

9. The display substrate of claim 8, further comprising a reference voltage line connecting to the first electrode of the second thin film transistor for supplying a reference voltage to the second thin film transistor in the pre-charging phase.

10. The display substrate of claim 9, comprising a data line integrally formed with the reference voltage line, the data line is connected to the data input terminal and is capable of supplying a reference voltage to the data input terminal in the pre-charging phase, the compensation phase and the light-emitting phase, and supplying a data voltage to the data input terminal in a writing phase.

11. The display substrate of claim 6, wherein the first electrode is a source, and the second electrode is a drain.

12. The display substrate of claim 7, wherein the first electrode is a source, and the second electrode is a drain.

13. The display substrate of claim 8, wherein the first electrode is a source, and the second electrode is a drain.

14. The display substrate of claim 9, wherein the first electrode is a source, and the second electrode is a drain.

15. A display panel, comprising the display substrate of claim 6, wherein the display panel further comprises a power supply connected to the power supply terminal, and the power supply is capable of outputting a low level signal to the power supply terminal in the pre-charging phase of the pixel circuit, and outputting a high level signal to the power supply terminal in the compensation phase, the writing phase and the light-emitting phase of the pixel circuit.

* * * * *